United States Patent [19]

Makino

[11] Patent Number: 5,627,771
[45] Date of Patent: May 6, 1997

[54] APPARATUS AND METHOD FOR EVALUATING SHAPE OF THREE-DIMENSIONAL OBJECT

[75] Inventor: Toshikazu Makino, Toyoake, Japan

[73] Assignee: Toyota Jidosha Kabushiki Kaisha, Toyota, Japan

[21] Appl. No.: 691,640

[22] Filed: Aug. 2, 1996

Related U.S. Application Data

[63] Continuation of Ser. No. 264,203, Jun. 22, 1994, abandoned.

[30] Foreign Application Priority Data

Jun. 22, 1996 [JP] Japan ................... 5-150618

[51] Int. Cl.$^6$ ................... G01B 5/008; G01B 7/008
[52] U.S. Cl. ........... 364/560; 364/552; 364/506; 364/474.17; 364/474.29; 364/474.37

[56] References Cited

U.S. PATENT DOCUMENTS

| | | | |
|---|---|---|---|
| 3,970,830 | 7/1976 | White et al. | 364/474.29 |
| 4,296,474 | 10/1981 | Hurt | 364/560 |
| 4,912,663 | 3/1990 | Joy et al. | 364/560 |
| 5,046,852 | 9/1991 | Hemetner et al. | 356/398 |
| 5,047,966 | 9/1991 | Crow et al. | 364/560 |
| 5,220,510 | 6/1993 | Araki | 364/551.02 |
| 5,243,665 | 9/1993 | Maney et al. | 382/8 |
| 5,266,021 | 11/1993 | Jacobson | 425/334 |
| 5,384,717 | 1/1995 | Ebenstein | 364/560 |

FOREIGN PATENT DOCUMENTS

| | | |
|---|---|---|
| 60-173407 | 9/1985 | Japan. |
| 61-008259 | 1/1986 | Japan. |
| 57-184654 | 5/1989 | Japan. |
| 60-27809 | 2/1992 | Japan. |
| 92/05399 | 4/1992 | WIPO. |

OTHER PUBLICATIONS

Patent Abstracts of Japan, vol. 10, No. 173, 18 Jun. 1986 & JP-A-61 023906 (Toyota Jidosha KK), 1 Feb. 1986.
Patent Abstracts of Japan, vol. 9, No. 151, 26 Jun. 1985 & JP-A-60 027809 (Toyota Jidosha KK), 12 Feb. 1985.
Patent Abstracts of Japan, vol. 13, No. 537, 30 Nov. 1989 & JP-A-01 221609 (Toyota Motor Corp), 5 Sep. 1989.

Primary Examiner—Emanuel T. Voeltz
Assistant Examiner—Kyle J. Choi
Attorney, Agent, or Firm—Kenyon & Kenyon

[57] ABSTRACT

An apparatus for evaluating the shape of a three-dimensional object by comparing direct measurements of the surface of an actual worked version of the object with its ideal shape. A representation of an ideal surface of the object based upon reference data is set within a given space. A worked surface of the object is also set within the given space, based upon measurements of the worked surface at several measurement points. A processor calculates the intersection point on the ideal surface of the line extending from each of the measurement points that perpendicularly intersects the ideal surface. The distance between each intersection point and its corresponding measurement point is calculated to evaluate the precision of the worked surface.

3 Claims, 8 Drawing Sheets

THREE-DIMENSIONAL
CURVED SURFACE
BELONGING TO UNIT
SQUARE

APPARATUS AND METHOD FOR EVALUATING SHAPE OF THREE-DIMENSIONAL OBJECT

This application is a continuation of application Ser. No. 08/264,203, filed on Jun. 22, 1994, abandoned.

BACKGROUND OF THE INVENTION

1. Field of the Invention

The present invention relates to an apparatus and method for evaluating the shape of a three-dimensional object, and particularly, to such an apparatus and method that evaluate the precision at a worked surface of a three-dimensional object by comparing the worked surface of the three-dimensional object actually measured in the form of space coordinates at a plurality of measurement points with an ideal surface of the three-dimensional object which has been stored in the form of three-dimensional curved surface data.

2. Description of the Prior Art

There is known a three coordinate measuring machine which measures the shape of a surface, which includes a curved surface, of a three-dimensional object. Such a three-coordinate measuring machine determines space coordinates at a plurality of measurement points by contacting a probe on the surface of the object and grasps the surface of the object based on a set of space coordinates. The three coordinate measuring machine is utilized in evaluating the precision of the three-dimensional shape of a workpiece. The surface of the workpiece measured by the three coordinate measuring machine is compared with an ideal surface of the workpiece defined by CAD shape data or design drawing data. The difference between the measured and the ideal surfaces determines the precision of the surface of the workpiece. When the workpiece is to be finished while utilizing the measurement of the three coordinate measuring machine, the amount of material cut off from the workpiece, that is, the distance from the measured surface of the workpiece to the ideal surface of the same (distance perpendicular to the ideal surface) must be determined.

For example, Japanese Patent Publication No. Hei 1-26817 discloses a system for determining such a perpendicular distance. Such a system first determines a reference point of a space coordinate on the ideal surface defined by the CAD shape data and also a perpendicular vector at the reference point. By using the perpendicular vector, the actual space coordinates of the worked surface of the three-dimensional object are then measured through the three coordinate measuring machine in the direction perpendicular to the ideal surface. The distance between the measured space coordinates and the reference point is determined by the perpendicular vector. In this manner, the perpendicular distance from the measured worked surface to the ideal surface based on the CAD shape data can be determined. In this example, the above results are utilized to display the surface of the workpiece as an image similar to contour lines, in which the sections are painted with different colors in accordance with the magnitude of the distance. The determined distance is also used to control marking on a workpiece.

In the aforementioned system of the prior art, the perpendicular vector must previously be determined from the CAD shape data and the probe should be moved along the perpendicular vector to determine the space coordinates of the actual surface. Such a perpendicular measurement cannot be carried out by the conventional three coordinate measuring machine, which requires an additional control mechanism for moving the probe in the direction perpendicular to the ideal surface. The three coordinate measuring machine for such a measurement raises another problem in that it must work upon receipt of the CAD shape data, so that the machine cannot be applied to systems other than a certain system which is connected to and controlled on-line by a CAD system. It is still difficult to move the probe precisely in the perpendicular direction, leading to an error upon measurement of the distance.

SUMMARY OF THE INVENTION

It is an object of the present invention to provide an apparatus and method for evaluating the shape of a three-dimensional object, which can utilize the measurement data obtained from a separate three coordinate measuring machine in determining the distance in the perpendicular direction.

To this end, the present invention provides an apparatus for evaluating the shape of a three-dimensional object, comprising means for setting an ideal surface of a three-dimensional object within a given space based on reference data, means for setting a worked surface of the three-dimensional object corresponding to the ideal surface within said space as a set of space coordinates obtained from measurements at a plurality of measurement points, intersection point calculating means for determining space coordinates at an intersection point at which a line extending from each of the measurement points perpendicularly intersects the ideal surface, and distance calculating means for determining the distance between the intersection point and the measurement point based on space coordinates of the determined intersection point and the measurement point, whereby the distance determined by said distance calculating means can be used to evaluate the precision of the worked surface.

With such an arrangement, the data of the measured worked surface can be compared with the ideal surface based on the reference data such as CAD shape data or the like, so that the perpendicular distance from the measurement point to the ideal surface can be determined. When the worked surface is to be measured by the three coordinate measuring machine, it is not required to move the probe in the direction perpendicular to the ideal surface. This can avoid various inconveniences such as the measurement associated with the CAD shape data, the complicated control in driving the probe, the introduction of additional facilities into the three coordinate measuring machine, and so on. In other words, the precision of the worked surface can be evaluated by utilizing the measurement data, obtained from a manual measurement or part-program measurement by any conventional three coordinate measuring machine of the off-line type, which is not connected to a CAD system. Further, accurate measurement can be carried out since the measurement itself is carried out by the conventional procedure of the three coordinate measuring machine.

The present invention also provides an apparatus for evaluating the shape of a three-dimensional object, comprising measurement data storage means for storing a worked surface of the three-dimensional object in the form of space coordinates at a plurality of measurement points, curved surface data storage means for storing an ideal surface of the three-dimensional object in the form of curved surface data, and processor means for determining an intersection point at which a line extending from each of said measurement points perpendicularly intersects the ideal surface based on the space coordinates from the measurement data storage means and the curved surface data from the curved surface data storage means, said processor means determining the distance between the intersection point and the corresponding measurement point based on the space coordinates of the measurement and intersection points, whereby the determined distance can be used to evaluate the precision of the worked surface.

With such an arrangement, the distance between the ideal and actual surfaces along the direction perpendicular to the ideal surface can be determined based on the measurement data of the worked surface on a previous measurement as well as the curved surface data of the ideal surface in three dimensions. Therefore, the measurement does not require the measuring procedure along the perpendicular direction. As a result, the measurement can be carried out by utilizing measurement data from the manual measurement or the part-program measurement by an off-line three coordinate measuring machine.

The present invention further provides a method for evaluating the shape of a three-dimensional object, comprising the steps of measuring a worked surface of the three-dimensional object through a three coordinate measuring machine at a plurality of measurement points in the form of space coordinates, plotting the measurement points relative to an ideal surface of the three-dimensional object which has previously been stored in the form of three-dimensional shape data, defining a perpendicular line from each of the plotted measurement points perpendicularly to the ideal surface to determine an intersection point between said perpendicular line and the ideal surface, and evaluating the precision of the worked surface of the three-dimensional object based on the distance between each of the intersection points and the ideal surface along the respective perpendicular lines.

With such an arrangement, after the measurements of the worked surface through the conventional procedure of the three coordinate measuring machine, the precision of the worked surface can be evaluated in the perpendicular direction. Therefore, the measurement can be carried out by utilizing measurement data from the manual measurement or the part-program measurement by a three coordinate measuring machine of an off-line type. As a result, the existing equipment can effectively be utilized without adding any additional facility to the three coordinate measuring machine. Accurate measurements can be performed since the measurements themselves are carried out through the normal operation of the three coordinate measuring machine.

These objects of the present invention, together with the other objects, features and advantages thereof, will be apparent from the following description of preferred embodiments with reference to the accompanying drawings.

DETAILED DESCRIPTION OF PREFERRED EMBODIMENT

The present invention will now be described by way of example with reference to the drawings.

Figure 1:
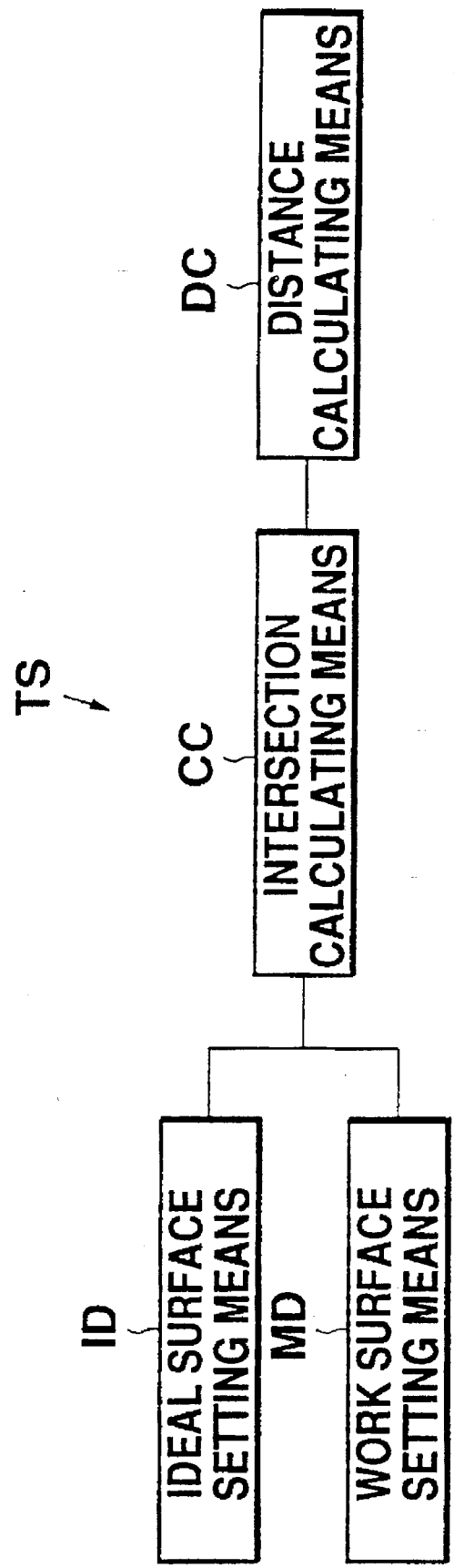
FIG. 1 is a block diagram showing the entire layout of an apparatus for evaluating the shape of a three-dimensional object which is constructed in accordance with the present invention.
Figure 4:
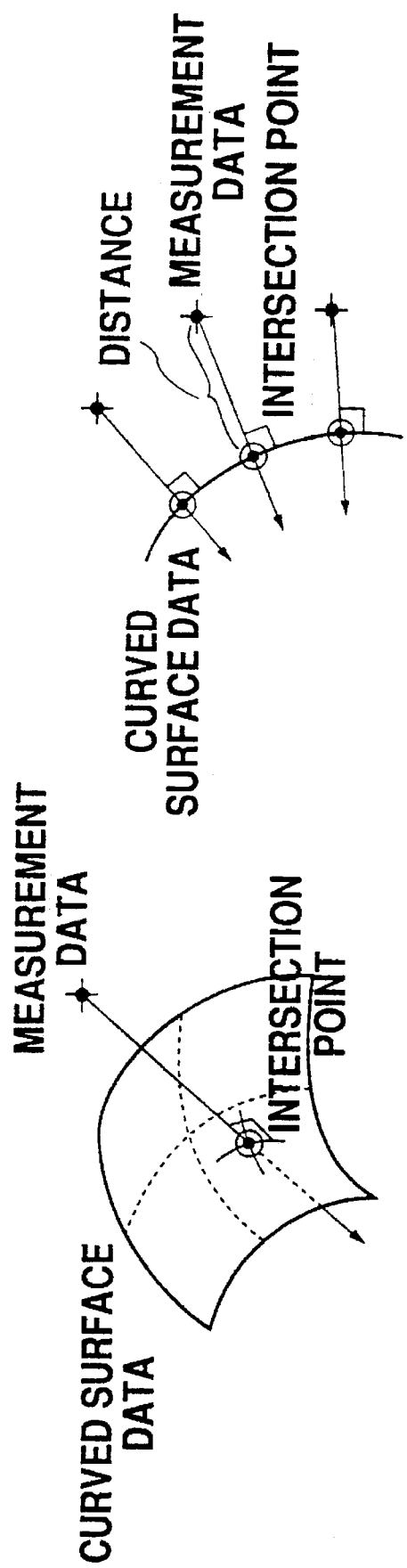
FIG. 4A and 4B is a view illustrating the calculation of intersection points from the measurement data and curved surface data.

As shown in FIG. 1, a shape evaluation apparatus TS for evaluating the shape of a three-dimensional object according to the present invention comprises an ideal surface setting means ID for setting the ideal surface of a three-dimensional object within a given space, a worked surface setting means MD for setting the worked surface of the three-dimensional object corresponding to the ideal surface within said space, intersection point calculating means CC for determining space coordinates at a point at which a perpendicular line extending from each of the measurement points perpendicularly intersects the ideal surface, and distance calculating means DC for determining the distance between the intersection point and the measurement point based on the space coordinates determined by the intersection point calculating means and the space coordinates of the measurement point. The ideal surface setting means ID includes storage means for previously storing an ideal surface as curved surface data determined by reference data such as CAD shape data, design drawing data or the like (see FIG. 4). The worked surface setting means MD includes storage means for storing, as measurement data, space coordinates measured by a three coordinate measuring machine at a plurality of measurement points on the worked surface of the three-dimensional object. The worked surface will be grasped as a set of measurement data.

Figure 2:
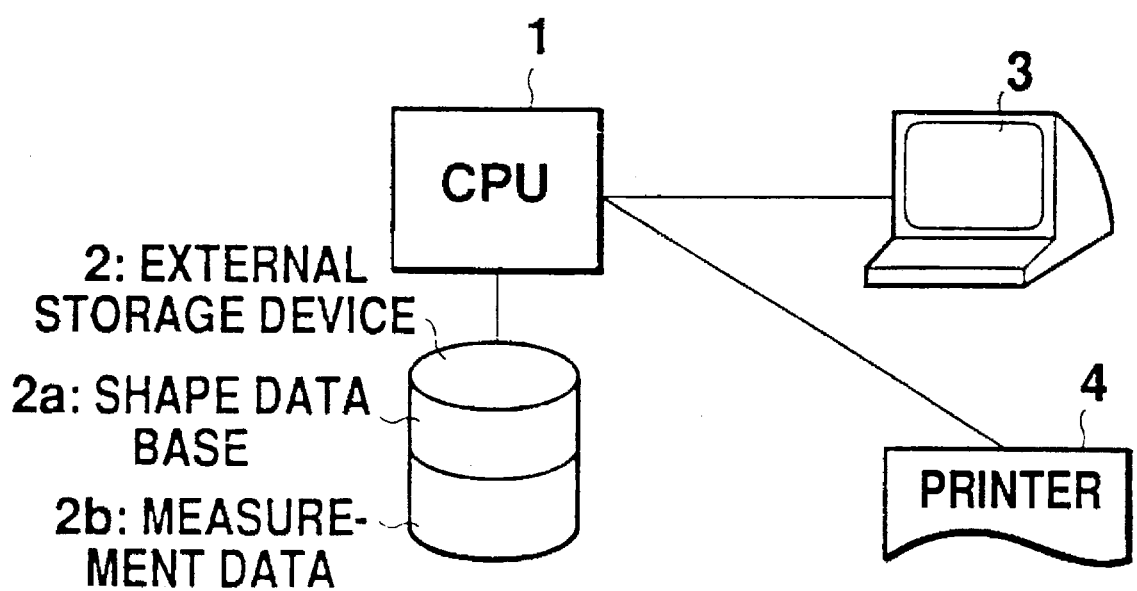
FIG. 2 is a view showing the details of the shape evaluation apparatus.

FIG. 2 shows the details of the shape evaluation apparatus, in which the CPU 1 is adapted to compare and analyze the measurement data for the worked surface of the three-dimensional object with curved surface data which define an ideal surface of the three-dimensional object. The ideal surface is created in designing and is used as a reference. More particularly, the CPU 1 functions as a processor means for determining the space coordinates of an intersection point at which a perpendicular line extending from each of the measurement points perpendicularly intersects the ideal surface and for determining a distance between the intersection point and the measurement point from the space coordinates at the measurement and intersection points. An external storage device 2 is connected to the CPU 1. The external storage device 2 has a shape data storage area 2a and a measurement data storage area 2b. The shape data storage area 2a stores a database of CAD shape data and serves as a curved surface data storage means for storing the ideal surface of the three-dimensional object in the form of curved surface date in three dimensions. The measurement data storage area 2b stores the measurement data from the three coordinate measuring machine and serves as a measurement data storage means for storing the worked surface of the three-dimensional object in the form of space coordinates at a plurality of measurement points. To the CPU 1 is further connected a graphic display 3 for displaying the results of the comparison and analysis as color images and a printer 4 for outputting the results of analysis as data.

When the worked surface of a three-dimensional object is to be evaluated by such an apparatus, the shape of the worked surface of the three-dimensional object is first measured by the three coordinate measuring machine. The three coordinate measuring machine may be of an off-line type which is well-known in the art. The measurement data may be one obtained from manual or part-program measurement. In other words, the three coordinate measuring machine may be of any type which can measure the worked surface of the three-dimensional object in the form of space coordinates.

Figure 3:
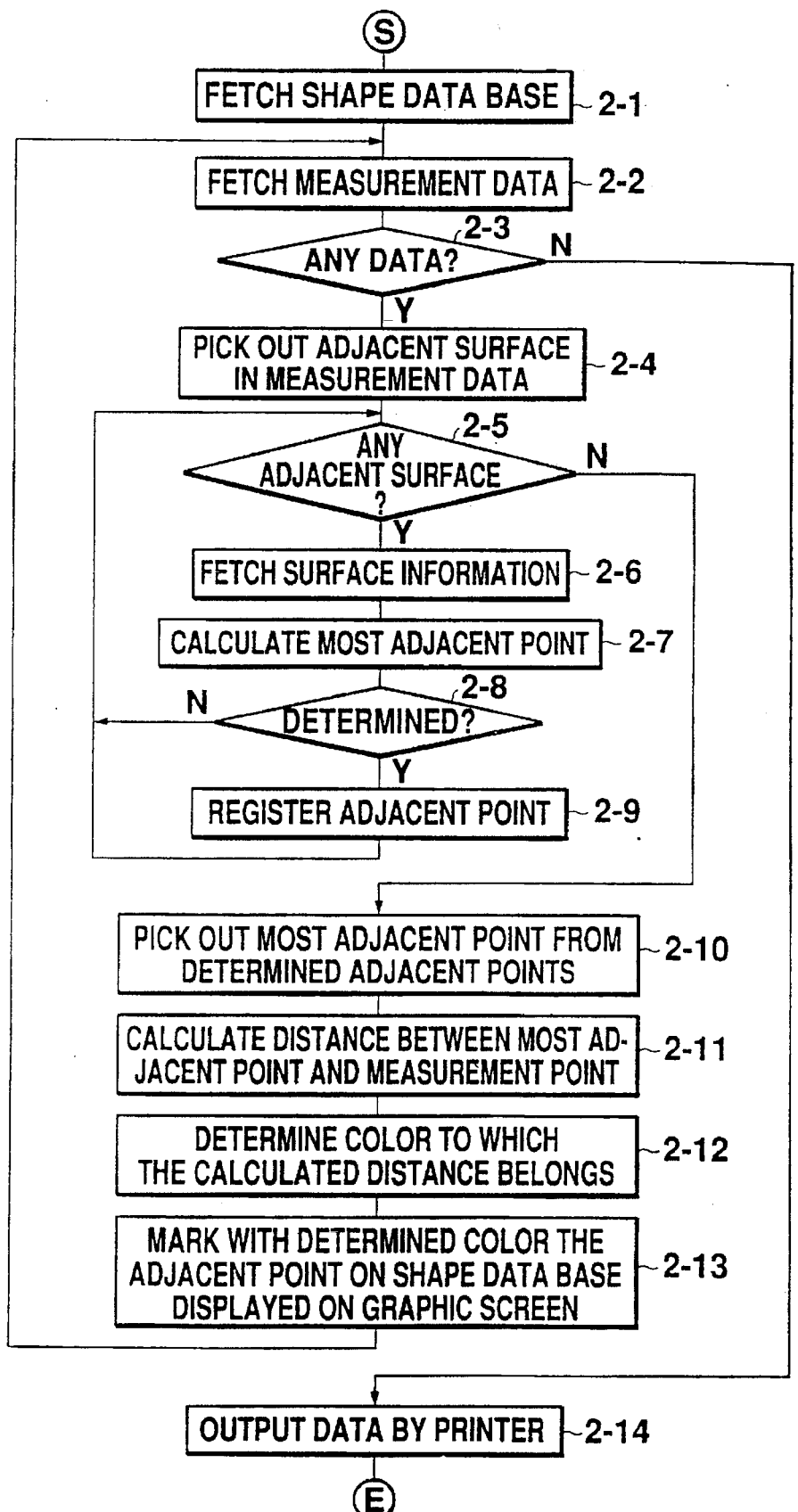
FIG. 3 is a flowchart illustrating the operation of the shape evaluation apparatus.

Measurement data measured by the three coordinate measuring machine are stored in the measurement data storage area 2b of the external storage device 2. On the other hand, the shape data storage area 2a of the external storage device 2 has previously registered a database of the CAD shape data of a three-dimensional object to be evaluated. The CPU 1 calls the data base from the shape data storage area 2b of the external storage device 2 and also sequentially calls the measurement data from the measurement data storage area 2b to calculate points on the data base which correspond to the measurement data. Subsequently, the CPU 1 calculates a distance between each of the points on the data base and the measurement data. Depending on the magnitude of these distances, the CPU 1 divides the worked surface of the three-dimensional object into sections with different colors. The resulting colored worked surface of the three-dimensional object is displayed on the graphic display 3 as a color image. More particularly, colors classified based on the magnitude of the distances are painted on the reference shape obtained from the data base. Thus, various distances from the reference surfaces at the respective points can be visualized. The printer 4 can output the measurement data, point data on the data base, distances and other factors. The operation of the apparatus according to this embodiment will be described in detail with reference to the flowchart shown in FIG. 3.

The data base used as reference of evaluation is first fetched from the shape data storage area 2a of the external storage device 2 (Step 2-1). The data base is a composite three-dimensional free curved surface which is formed by a number of three-dimensional free curved surfaces stored as curved surface data.

In Step 2-2, only one measurement data item is fetched from the measurement data storage area 2b of the external storage device 2. In Step 2-3, subsequently, it is judged whether or not any measurement data remains in the measurement data storage area 2b. If there is no measurement data, it is then judged that all the measurement data have been fetched from the measurement data storage area 2b. The program proceeds to Step 2-14 wherein the process is terminated. If there is any measurement data, the program proceeds to Step 2-4 wherein a plurality of curved surface data which approximate the measurement data are selected from the data base of the curved surface shapes of the three-dimensional free curved surface shapes as adjacent surfaces. In Step 2-5, subsequently, it is judged whether or not there is any adjacent surface left to be subjected to an intersection point calculation which will be described later. If there is any adjacent surface to be processed, the program proceeds to Step 2-6 wherein a curved surface data item relating to one of the selected adjacent surfaces is fetched. If there is no adjacent surface, the program proceeds to Step 2-10. In Step 2-7, the perpendicular line, perpendicular to the three-dimensional free curved surface shape represented by the curved surface data as well as the intersection point between the perpendicular line and the three-dimensional free curved surface shape are calculated based on the selected measurement data with the curved surface data fetched in the above manner. FIG. 4A and 4B show a relationship between the three-dimensional free curved surface and the intersection points at which the perpendicular lines extending from the measurement data perpendicularly intersect the three-dimensional free curved surface. In such a manner, a line perpendicular to the curved surface is selected from straight lines passing through the measurement data and the intersection point between that line and the curved surface is determined.

In Step 2-8, it is judged whether or not an intersection point is determined. If it is judged that the intersection point is determined, in Step 2-9 the space coordinates of that intersection point are registered in an exclusive memory as an adjacent point and the program then returns back to Step 2-5. If it is judged that no adjacent point is determined, the program returns back to Step 2-5. Such a process is repeated until intersection points are determined relating to all the selected curved surface data.

If it is judged in Step 2-5 that all the adjacent surfaces have been processed, the program proceeds to Step 210 wherein an adjacent point approximating most closely to the three-dimensional free curved surface is selected from the registered adjacent points. In Step 2-11, a distance between the selected adjacent point and the three-dimensional free curved surface is calculated based on the space coordinates of the selected adjacent point and measurement data.

Figure 5:
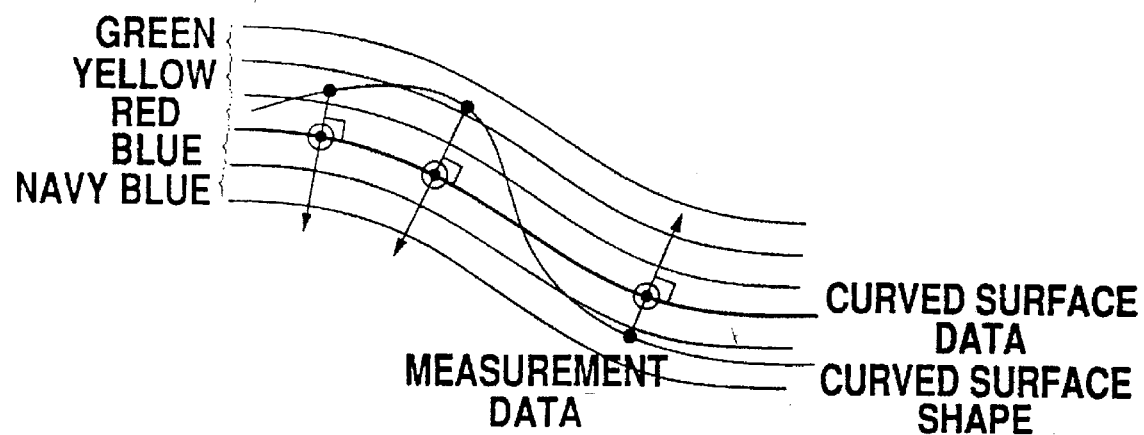
FIG. 5 is a view illustrating the displayed colors of the three-dimensional object.
Figure 6:
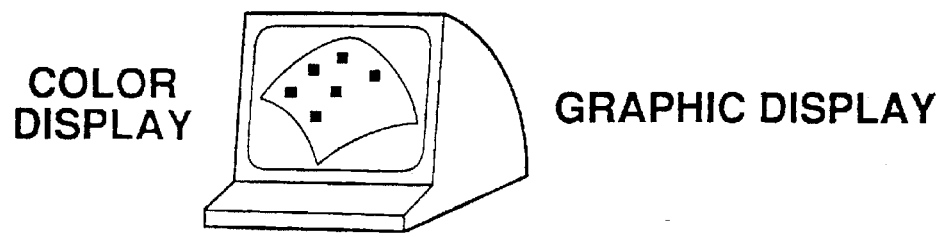
FIG. 6 is a view showing colors displayed by a graphic display.

Subsequently, a display color corresponding to the calculated distance is selected from colors previously classified in accordance with the magnitude of distance (Step 2-12). The display colors are stepwisely allocated depending on the distance from the curved surface data of the measured worked surface. As shown in FIG. 5, for example, red, yellow and green colors may be arranged sequentially from the curved surface data in the outward direction while blue and navy blue colors may be allocated sequentially away from the curved surface data in the inward direction. The graphic display 3 will display such allocated display colors for every measurement data. Once a distance for one item of measurement data is determined, the intersection point of the three-dimensional curved surface displayed on the curved surface data is marked by the determined display color, and the results of analysis for the measurement and curved surface data are visualized (Step 2-13). The program thereafter returns back to Step 2-2 wherein the next measurement data is fetched and processed in the same manner. When all the measurement data have been processed, the program proceeds from Step 2-3 to Step 2-14 wherein various data are outputted from the printer 4.

Figure 7:
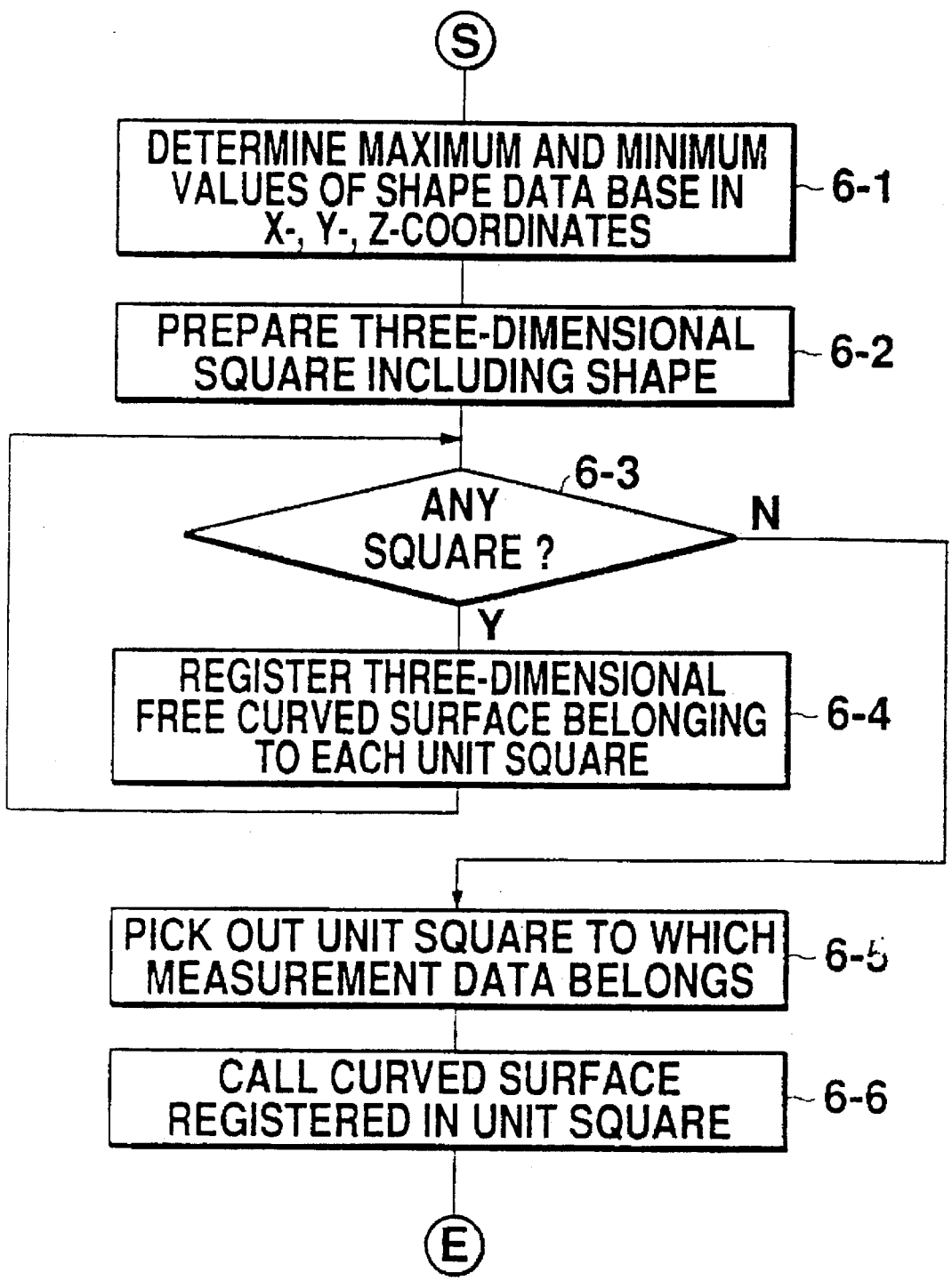
FIG. 7 is a flowchart showing a process of calculating an adjacent surface.
Figure 8:
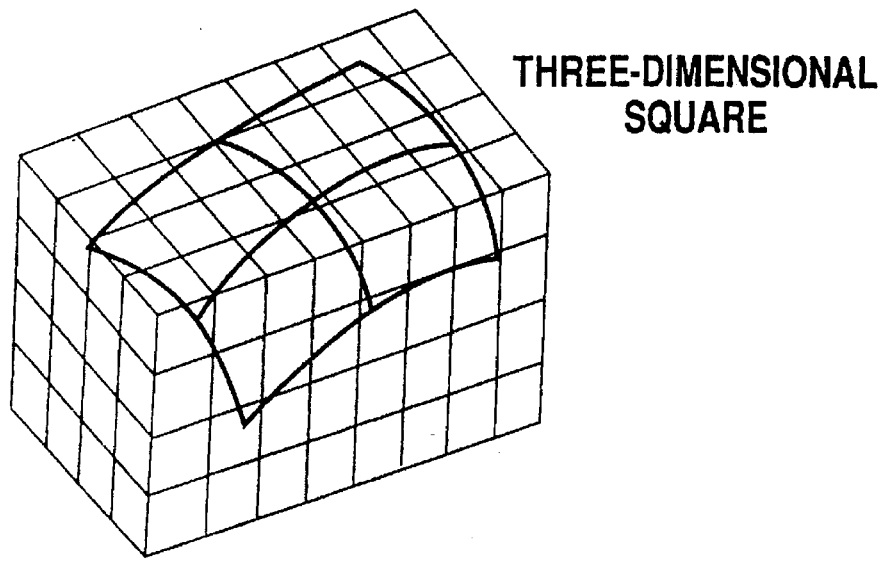
FIG. 8 is a flowchart illustrating three-dimensional square information.

The selection of the adjacent surface approximating the measurement data will be described in more detail. As shown in FIG. 7, the maximum and minimum values of the space coordinates, that is, X-, Y- and Z-coordinates of the curved surface data to be processed are calculated (Step 6-1). In Step 6-2, three-dimensional square information including the curved surface data is prepared based on the maximum and minimum values of these X-, Y- and Z-coordinates. The three-dimensional square information is defined as a space of a three-dimensional square or rectangle, containing all the three-dimensional free curved surfaces defined by the curved surface data and divided into unit cubes of a predetermined magnitude. The pitch data in the three-dimensional square have previously been set as parameters.

Figure 9:
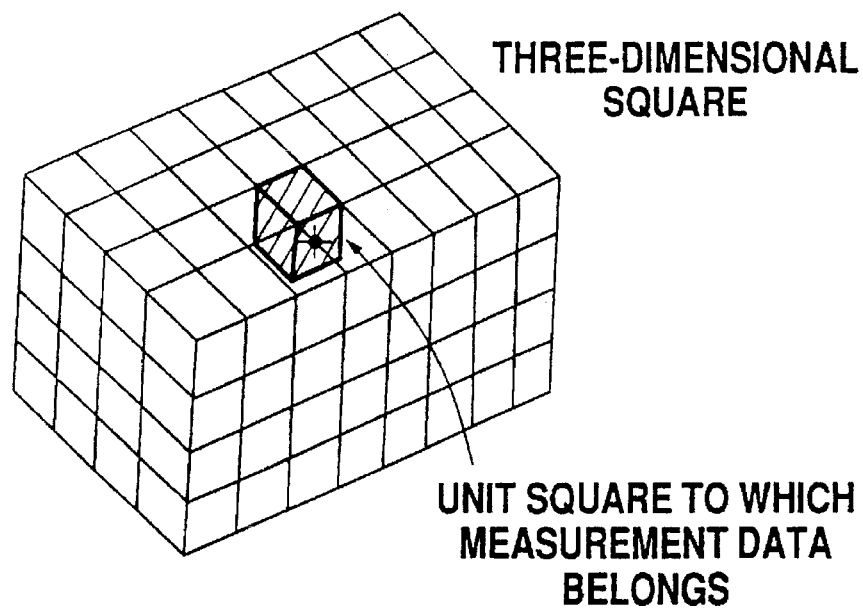
FIG. 9 is a view showing a unit cube in which measurement data exists.
Figure 10:
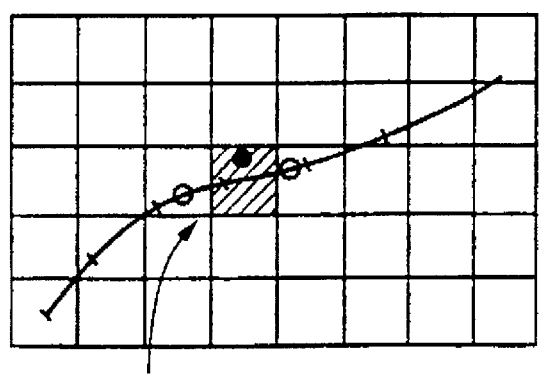
FIG. 10 is a view showing a three-dimensional curved surface belonging to the unit cube.

In Step 6-3, it is then judged whether or not there is any unit cube to be processed. If it is judged that there is no unit cube to be processed, it is judged that the process has terminated and the program then proceeds to Step 6-5. If there is a unit cube, the three-dimensional free curved surface belonging to that unit cube is picked out and registered in the exclusive memory (Step 6-4). After the registering step, the program returns back to Step 6-3. Such a procedure is repeated until all the unit cubes have been processed in such a manner. When all the three-dimensional free curved surfaces belonging to the respective unit cubes have been registered, the program proceeds to Step 6-5 wherein a unit cube to which a measurement data belongs is picked out. In other words, a unit cube to which the measurement data belongs is selected, as shown in FIG. 9. Subsequently, the program calls a curved surface registered to the selected unit cube (Step 6-6). In such a manner, the three-dimensional curved surfaces existing near the measurement points can be picked out.

It should be noted that the same procedure for one measurement point can be utilized for the other measurement points once the three-dimensional free curved surfaces for every unit cube have been registered through Steps 6-3 and 6-4. Therefore, the registering need only be made the first time for the procedure of all the measurement points.

I claim:

1. A method of evaluating the shape for a three-dimensional object, comprising the steps of:

measuring and storing a worked surface of the three-dimensional object through a three coordinate measuring machine at a plurality of measurement points in the form of space coordinates, wherein the space coordinates are measured from any direction;

plotting the measurement points relative to an ideal surface of the three-dimensional object which has previously been stored in the form of three-dimensional shape data;

defining a line from each of the plotted measurement points perpendicularly to the ideal surface to determine an intersection point between said perpendicular line and the ideal surface; and evaluating the precision of the worked surface of the three-dimensional object based on the distance between each of the intersection points and the ideal surface along the respective perpendicular lines.

2. An apparatus for evaluating the shape of a three-dimensional object, comprising:

a processor setting an ideal surface of the three-dimensional object within a given space based on reference data, said processor setting a worked surface of the three-dimensional object corresponding to the ideal surface within said space as a set of space coordinates obtained from measurements at a plurality of measurement points, the space coordinates being measured from any direction, said processor determining space coordinates at an intersection point at which a line extending from each of the measurement points perpendicularly intersects the ideal surface, and said processor determining the distance between the intersection point and the measurement point based on space coordinates of the determined intersection point and the measurement point, whereby the distance determined by said processor can be used to evaluate the precision of the worked surface.

3. An apparatus for evaluating the shape of a three-dimensional object, comprising:

a measurement data storage storing a worked surface of the three-dimensional object in the form of space coordinates at a plurality of measurement points, wherein the space coordinates are measured from any direction;

a curved surface data storage storing an ideal surface of the three-dimensional object in the form of curved surface data; and a processor, based on the space coordinates from the measurement data storage and also the curved surface data from the curved surface data storage, determining an intersection point at which a line extending from each of said measurement points perpendicularly intersects the ideal surface, said processor determining the distance between the intersection point and the corresponding measurement point based on the space coordinates of the measurement and intersection points, whereby the determined distance can be used to evaluate the precision of the worked surface.

* * * * *